United States Patent [19]
Ruedebusch

[11] 3,836,029
[45] Sept. 17, 1974

[54] BOAT CONVEYANCE MEANS
[76] Inventor: Burnell A. Ruedebusch, 3200 S.E. Blvd., Wichita, Kans.
[22] Filed: Jan. 10, 1973
[21] Appl. No.: 322,442

[52] U.S. Cl. ............................. 214/450, 224/42.08
[51] Int. Cl. .............................................. B60r 9/00
[58] Field of Search .......... 214/450, 77; 224/42.08, 224/42.03 R, 42.1

[56] References Cited
UNITED STATES PATENTS

| | | | |
|---|---|---|---|
| 3,435,970 | 4/1969 | Sutton | 214/450 |
| 3,531,006 | 9/1970 | Farchmin | 214/450 |
| 3,696,953 | 10/1972 | Kim | 214/450 |
| 3,716,156 | 2/1973 | Risney | 214/450 |

*Primary Examiner*—Robert J. Spar
*Assistant Examiner*—John Mannix

[57] ABSTRACT

This invention relates to a boat conveyance means readily attachable to a vehicle structure having means thereon to grasp a boat structure in its normal usage condition and elevate and invert the same to a top portion of the supporting vehicle structure. More specifically, this invention is a boat conveyance means having a basic support means connectable to a vehicle structure and operable to be attached to a boat structure; an intermediate support and anchor means connected to the vehicle structure having means thereupon to anchor the boat structure in the conveyance position; and a winch means mounted on the vehicle structure and operable to raise and lower the boat structure to and from the vehicle structure.

9 Claims, 8 Drawing Figures

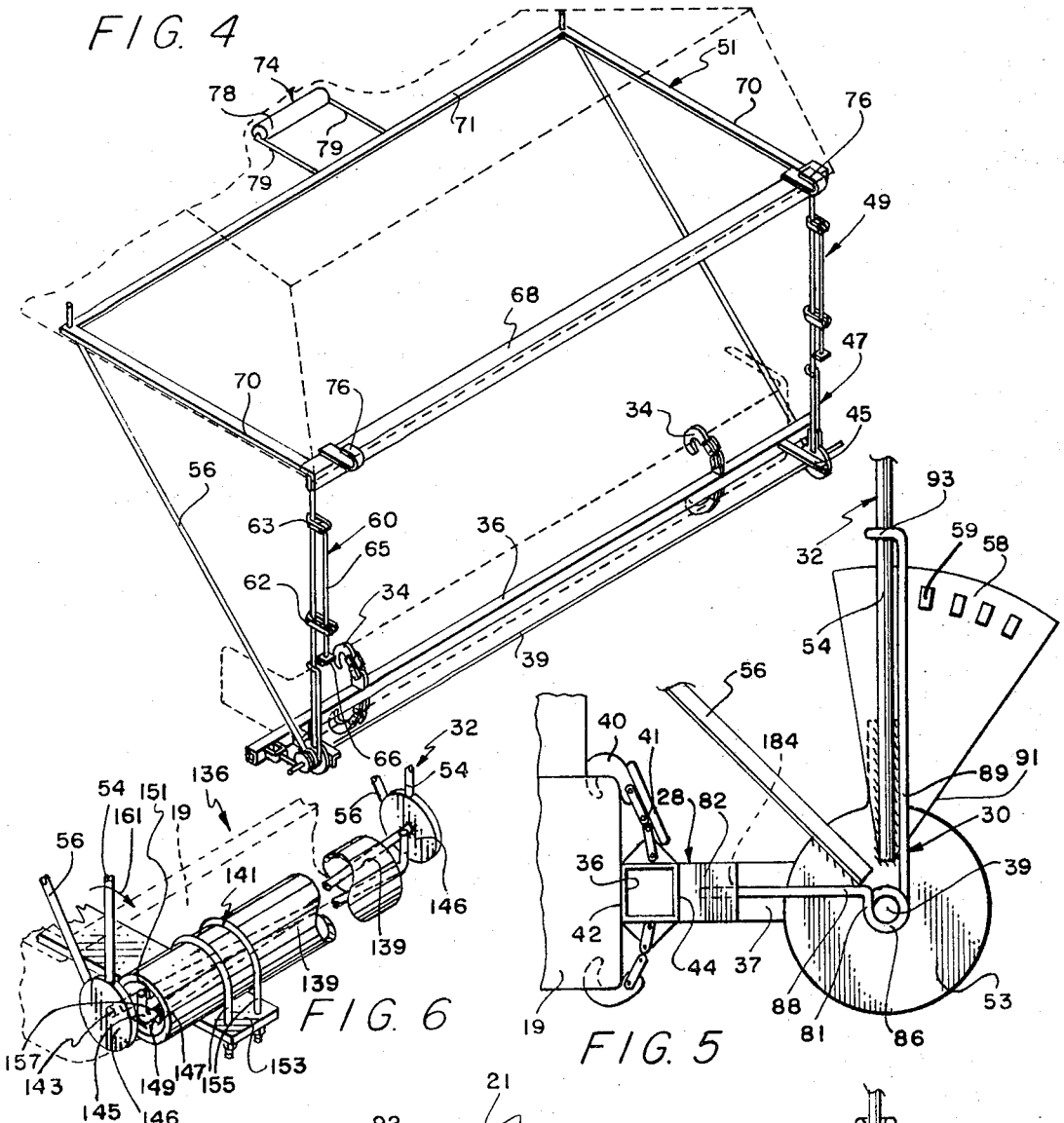
FIG. 4
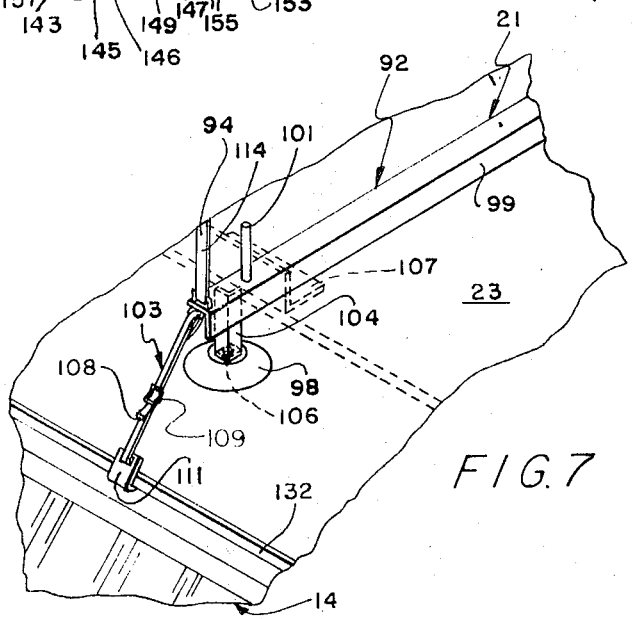
FIG. 6
FIG. 5
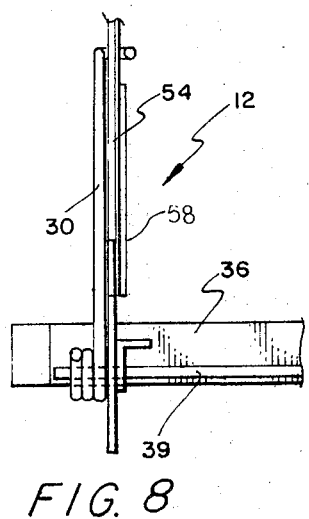
FIG. 7
FIG. 8

BOAT CONVEYANCE MEANS

This invention relates to a boat conveyance means movable from a generally horizontal position connected to a boat structure and rotatable substantially 180° to the conveyance position for support on the top portion of a vehicle structure.

In the prior art, numerous types of boat loading and unloading apparatuses are found which are attachable to a boat structure and operable in some manner to place the same on the upper surface of an automobile, a pick-up or camper truck for conveyance. However, the prior art structures are generally complicated in nature; hard to assemble; difficult to operate; and undependable in usage. The prior art boat loaders are not operable to connect to a boat structure in the water and invert the same for conveyance on a vehicle structure. Also, the prior art boat carrier and hoist mechanisms are not provided with means so that the actual movement of the boat structure is easily accomplished without the requirement of personal, physical effort and energy required.

In one preferred embodiment of this invention, a boat conveyance means is provided which can be readily attached to a vehicle structure such as an automobile, a pick-up truck, or a camper structure and illustrated herein as being attached to a pick-up truck vehicle structure. The boat conveyance means includes a basic support means to be attached to a rear bumper structure of the vehicle structure; an intermediate support and anchor means attached to a top surface of the vehicle structure for support and securing of the boat structure to be conveyed thereby; and a winch means attached to a front portion such as a front bumper section of the vehicle structure. The basic support means includes a bumper connector means attachable to the rear bumper structure; a torque means mounted on the bumper connector means; and a support frame means connected to the bumper connector means and operably connected to the torque means to bias the support frame means from the loaded to the unloaded condition. The support frame means includes an end support assembly; a vertical support assembly; a rearward support assembly; and a boat or horizontal support assembly to receive the boat structure thereupon. The intermediate support and anchor means includes a first anchor assembly, a connector belt assembly, and a roller assembly. The first anchor assembly includes suction cup members interconnected by a support angle iron member having connector posts thereupon and secured by strap members to the upper portion of the vehicle structure. The connector belt assembly is secured to the anchor assembly and is operable to be strapped about the boat structure in the loaded condition as a safety feature. The winch means includes a winch member secured to forward portions of the vehicle such as the front bumper structure having a guide pulley and a connector line secured by an anchor ring connected to the boat structure. The winch means is operable to load and unload the boat structure from the vehicle structure in a predetermined manner.

One object of this invention is to provide a boat conveyance means which may be attached to a vehicle structure having means for loading and unloading a boat structure, such conveyance means can be connected to the boat structure in its normal usage condition and then elevate and laterally move the same for mounting and conveyance on a vehicle structure.

One other object of this invention is to provide a boat conveyance means having a basic support means secured to the rear bumper member of a vehicle structure; an intermediate support and anchor means mounted on an upper portion of the vehicle structure for guiding and anchoring the boat structure in the loaded condition; and a winch means operably connected to a front bumper member of the vehicle structure and operably connected to the boat structure for loading and unloading not requiring excessive effort by the operator.

Still, one further object of this invention is to provide a boat conveyance means having torque means to bias a boat structure to the unloaded condition whereupon a winch means is operable to overcome subject bias and move the boat structure to a loaded condition with little physical effort involved.

Still, another object of this invention is to provide a boat conveyance means which can be readily attached tO a vehicle structure for carrying a boat structure on the top portion thereof which is economical to manufacture; simple to install; safe in operation; easy to use requiring little physical effort on the part of the operator to load and unload the boat structure thereon; and durable in construction.

Various other objects, advantages, and features of the invention will become apparent to those skilled in the art from the following discussion, taken in conjunction with the accompanying drawings, in which:

FIG. 4 is an enlarged fragmentary perspective view showing a rear portion of the boat conveyance means of this invention;

FIG. 5 is an enlarged fragmentary side elevational view illustrating a bumper connector means of the basic support means of the boat conveyance means of this invention;

FIG. 6 is a fragmentary perspective view of a second embodiment of a torque means of the boat conveyance means of this invention;

FIG. 7 is a fragmentary perspective view illustrating an intermediate support and anchor means of the boat conveyance means of this invention; and FIG. 8 is a rear fragmentary elevational view illustrating a torque means of the boat conveyance means of this invention.

Figure 1:
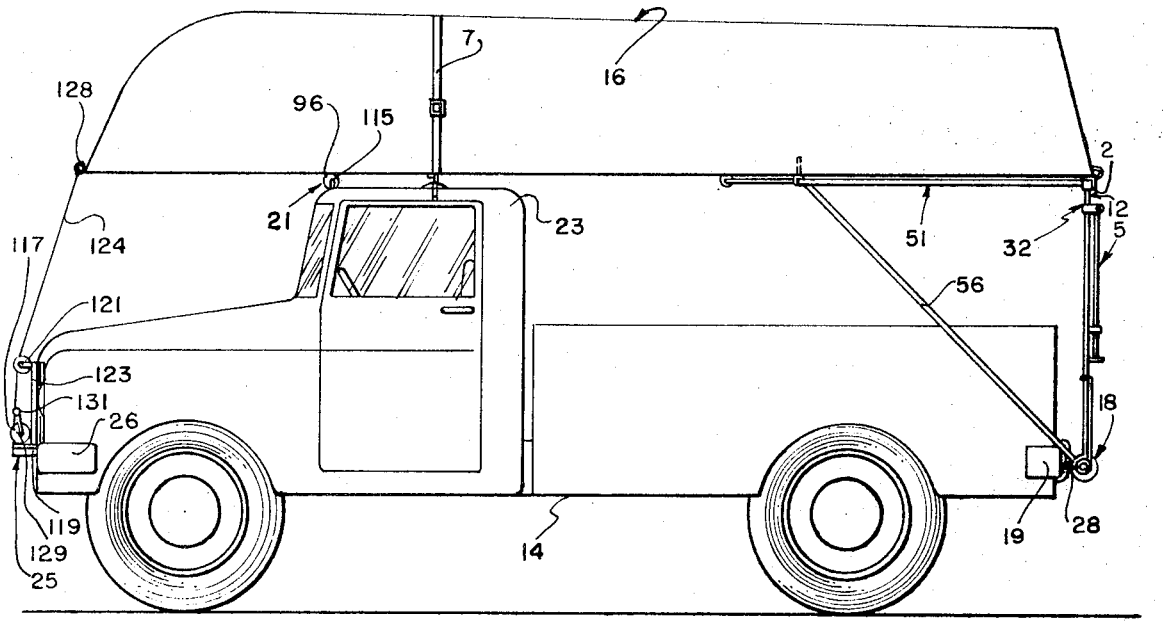
FIG. 1 is a side elevational view of a pick-up truck vehicle having a boat structure mounted on a boat conveyance means of this invention.

The following is a discussion and description of preferred specific embodiments of the new boat conveyance means of this invention, such being made with reference to the drawings, whereupon the same reference numerals are used to indicate the same or similar parts and/or structure. It is to be understood that such discussion and description is not to unduly limit the scope of the invention.

Referring to the drawings in detail in FIG. 1, a boat conveyance means of this invention, indicated generally at 12, is shown as attached to a vehicle structure and more specifically, to a conventional pick-up truck structure 14 having a boat structure 16 secured thereto in an inverted condition. Although the pick-up truck structure has been illustrated, it will become obvious that the boat conveyance means 12 of this invention may be attached to an automobile, a camper structure, or other such conveyance vehicles. Also, the boat structure 16 is illustrated as a conventional row or fishing type boat structure, it is obvious that numerous types of boat structures may be carried with the boat conveyance means 12 of this invention.

The boat conveyance means 12 includes a basic support means 18 connected to a rear bumper member 19 of the vehicle structure 14; an intermediate support and anchor means 21 connected to an upper portion of the vehicle structure 14 such as above the cab area indicated at 23; and a winch means 25 attached to a forward portion such as a forward bumper member 26 of the vehicle structure 14 and connectable to the boat structure 16 for loading and unloading purposes as will become obvious.

The basic support means 18 includes a first bumper connector means 28 attached to the bumper member 19; a torque means 30 mounted on the connector means 28; and a support frame means 32 pivotally connected to the bumper connector means 28 and connected to the torque means 30 for proper operation thereof. The bumper connector means 28 includes a pair of clamp members 34 secured in spaced relationship to the bumper member 19; an elongated tubular support member 36 interconnecting the spaced ones of the clamp members 34; angle iron member 37 secured to the tubular support member 36 and extended rearwardly therefrom; and an elongated support shaft 39 mounted within and secured to the angle iron members 37.

Figure 3:
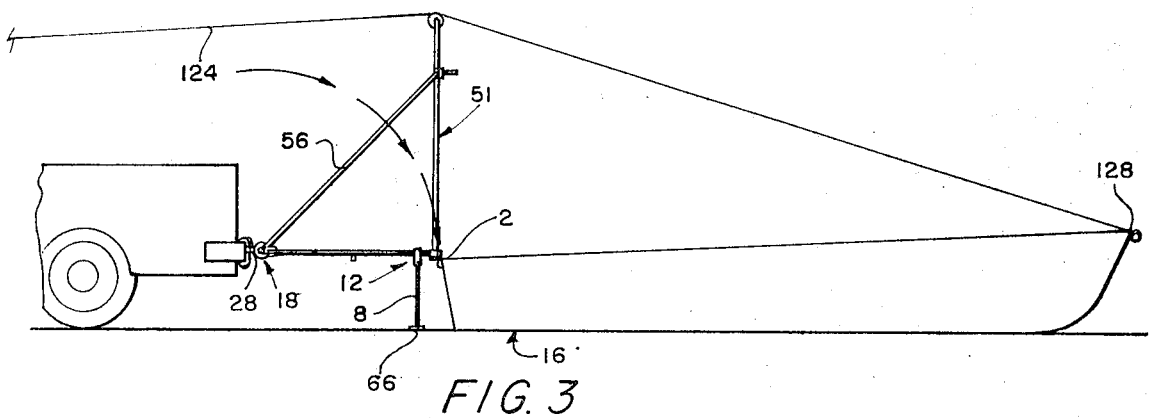
FIG. 3 is a fragmentary side elevational view similar to FIG. 2 illustrating the boat conveyance means moved to the unloaded condition.

More specifically, the clamp members 34 are of a generally claw-like structure having connector ends 40 and anchor clamp members 41 operable in a substantially conventional manner so as to attach and be released from the bumper member 19 as shown in FIGS. 3 and 4. Of course, other types of clamp members can be used with the primary purpose to securely anchor to the bumper member 19 in a manner similar to hitch members for pulling trailer structure and the like.

The elongated tubular support member 36 is of square shape in transverse cross section having one upright side 42 engageable against the bumper member 19 for rigidity. The angle iron members 37 are welded to an upright sidewall 44 of the tubular support member 36 and extend outwardly therefrom being parallel and spaced as shown in FIG. 4. An outer end of each angle iron member 37 is provided with a hole therewithin so as to receive the anchored support shaft 39 therethrough.

The support frame means 32 includes an end support assembly 45; a vertical support assembly 47 secured to the end support assembly 45; a rearward support assembly 49; and a horizontal support assembly 51. The end support assembly 45 includes a pair of spaced circular support plates 53 mounted for rotational movement on the support shaft 39; a spaced pair of upright connector bars 54 welded to respective ones of the circular support plates 53; and a pair of parallel forwardly extended support rods 56 respectively secured to the circular support plates 53 for support of the horizontal support assembly 51 as will be explained.

As shown in FIG. 5, the upright connector bars 54 and the support rods 56 are welded to respective circular support plates 53 for conjoint movement therewith. An adjustment plate 58 is shown welded to each of the circular support plates 53 and connector bars 54 having connector lugs 59 thereon for adjustment of the torque means 30 as will be explained.

The rearward support assembly 49 includes on each of the upright connector bars 54 a support foot assembly 60 and a guide lug 62 associated therewith as shown in FIG. 4. The support foot assembly 60 includes a first, U-shaped connector lug 63 secured to the connector bar 54; an elongated rod member 65 pivotally connected at the upper end to the connector lug 63; and the lower end of the rod member 65 secured to a plate like foot member 66. The support foot assembly 60 is maintained in a vertical condition under the force of gravity support thereof when moved to the loading condition as shown in FIG. 3. It is noted that the guide lugs 62 align the support rod members 65 during movement and may be provided with strap members to hold the rod members 65 firmly thereagainst if so desired during transport.

The horizontal support assembly 51 includes a primary angle iron member 68 secured to the top ends of the connector bars 54 extended thereacross; spaced, parallel strap members 70 secured to the primary member 68; a forward connector strap 71 joining the strap members 70; a support roller 74 mounted on the connector strap 71; and a pair of boat connector clamps 76 secured to the primary angle iron member 68. The support roller 74 includes a roller member 78 rotatably mounted on support lugs 79 secured to the connector strap 71. The connector clamps 76 are of a J-shape attachable to the boat structure 16. The horizontal support assembly 51 cooperates with the end support assembly 45 so as to provide required support while in the boat conveyance condition as shown in FIG. 1.

As shown in FIG. 5, the torque means 30 includes a pair of torque spring members 81 mounted about the support shaft 39 and connected to stationary connector lugs 82. The connector lugs 82 are of a generally U-shape having a central hole 84 and secured by welding to the rearward upright sidewall 44 of the tubular support member 36 of the bumper connector means 28 as shown in FIG. 4 and 5. This holds one portion of the torsion spring members 81 against movement.

As shown in FIG. 5, the torsion spring members 81 each include a coiled main body 86, a first arm 88, and a second arm 89 extended therefrom. The first arm 88 is placed within the hole 84 of the respective connector lug 82 so as to be held in an anchored condition. The second arm 89 has an elongated body 91 with a hook portion 93 at the upper end to be placed about the respective upright connector bar 54. It is noted that the torsion spring members 81 are mounted at respective ends of the support shaft 39, connected to the connector bars 54, and operable to bias the entire support frame means 32 in a rearward or clockwise direction as viewed in FIG. 1. As shown in FIG. 5, it is noted that the adjustment plate 58 with the plurality of connector lugs 59 is such that the rotational force of the torque spring members 81 can be varied on movement of the second arms 89 into different ones of the connector lugs 59 which may be desired on boat structures 16 of various lengths and weights.

The intermediate support and anchor means 21 includes a first main anchor assembly 92; a connector belt assembly 94 secured to the anchor assembly 92; and a forward roller assembly 92. The forward roller assembly 96 may be secured by suction cups or by bolting the forward or cab area 23 of the pick-up vehicle structure 16 as illustrated in FIG. 1. This aids in providing support and cushion to the boat structure 16 when in the loaded condition.

As shown in FIG. 7, the anchor assembly 92 includes a pair of spaced suction cup members 98 interconnected by a main support member 99 having connector posts 101 thereon and provided with securing strap assemblies 103 at opposite ends. The suction cup members 98 are secured through upright angle iron members 104 and bolt members 106 to the support member 99. The support member 99 is of an angle iron construction having an upper flat portion to receive the boat structure 16 thereagainst. Also, the connector posts 101 at spaced intervals are adapted to be placed with a circular opening in an oar lock structure indicated at 107 as shown in dotted lines in FIG. 7. This operates to secure the boat structure 16 against lateral movement in conjunction with the upright connector posts 101. The securing strap assemblies 103 are provided with a conventional strap member 108 having a buckle member 109 with one end secured to the support member 99 and the opposite end secured to a hook member 111 which can be secured to a drainage gutter 112 as shown in FIG. 7.

The connector belt assembly 94 is a belt member 114 to be placed over the boat structure 16 to secure same against the support member 99 for conveyance purposes.

The roller assembly 96 includes a roller member 115 secured to the cab area by suction cups or the like and provides cushion and vertical support to the boat structure 16.

As shown in FIG. 1, the winch means 25 includes a main winch member 117 secured by a connector support plate 119 to the forward portion of the vehicle structure 16 such as to the bumper member 26 by clamp members or the like. The winch means 25 further includes a guide pulley 121 secured to an upright plate 123 and having trained thereover a connector line 124 having its outer end secured to ring member 128 found on the forward end of the boat structure 16 to be conveyed. The winch member 117 is provided with a main spool 129 having a winch handle 131 and operated through a ratchet structure (not shown) so as to wind and unwind the cable or connector line 124 in a conventional manner. The connector line 124 is trained over the guide pulley 121 so as to remain spaced from the forward portion of the vehicle structure 14.

In the use and operation of the boat conveyance means 12 of this invention, it is attached to the front and rear bumper sections and the uppermost portion of a vehicle structure. The basic support means 18 is connected through the bumper connector means 28 to the rear bumper member 19 as shown in FIG. 1 by the pair of clamp members 34. The winch means 25 is attached by clamp members or bolt members to a front bumper member 26 of the pick-up truck vehicle structure 14. Next, the intermediate support and anchor means 21 includes the anchor assembly 92, connector belt assembly 44, and the forward roller assembly 96 mounted on the cab section 23 of the pick-up truck structure 14. More specifically, the anchor assembly 92 is secured by the securing strap members 108 and the hook members 111 to the drainage gutter 132.

On assuming that the boat structure 16 is loaded as shown in FIG. 1, the boat structure 16 is anchored in this inverted condition for conveyance purposes. The winch means 25 is placed in a locked condition and the connector belt member 114 is passed over the top surface of the boat structure 16 to anchor during conveyance.

Figure 2:
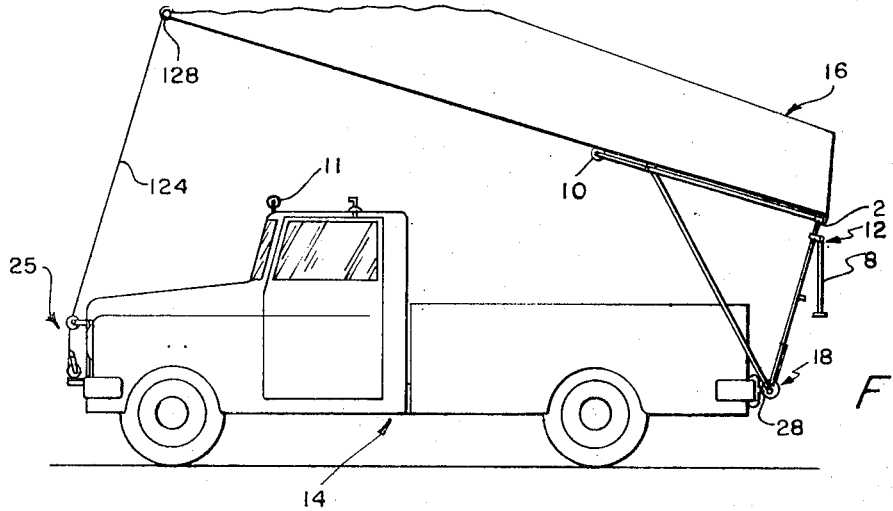
FIG. 2 is a reduced fragmentary view similar to FIG. 1 illustrating the boat conveyance means being actuated toward the unloaded condition.

On unloading the boat structure 16, the connector belt member 114 is first released and the winch means 25 is unlocked. The winch means 25 is slowly unwound with movement of the boat structure 16 to the position as shown in FIG. 2. During this movement, the torque means 30 and, more specifically, the torque spring members 81 operate to raise and bias the boat structure 16 in a clockwise direction as viewed in FIG. 2. This operation does not require much physical labor as the torque spring members 81 do the actual lifting of the boat structure 16. Also, the connector clamps 76 and the connector posts 101 holds the boat structure 16 to the support frame means 32.

On further release of the connector line 124 through the winch member 117, it is obvious that the interconnected boat structure 16 moves in the clockwise direction as shown in FIG. 2 to a rearward position. The boat structure 16 is not only provided for inverted movement but it is also noted that it is moved rearwardly from the rear bumper member 19 of the vehicle structure 14 for ease of loading and unloading.

On the boat structure 16 reaching the nearly upright condition with the horizontal support assembly 51 moved to the vertical condition as shown in FIG. 3, the rearward support assembly 49 with the foot member 66 is in contact with the support surface so as to provide vertical support. In this condition, the connector line 124 is further released from the winch member 117 so that the boat structure 16 moves to a horizontal position to be placed in the water and ready for launching. In the position of FIG. 3, it is obvious that the boat structure is ready to be used and the connector line 124 may be detached from the anchor ring member 128 and the entire boat conveyance means 12 can be moved by the winch means 25 to the non-conveyance condition.

On movement of the boat conveyance means 12 to the upright condition without conveying the boat structure 16, the free end of the connector line 124 can be attached to the support roller member 78. On rotation of the winch means 25, the basic support means 18 is moved to the position as shown in FIG. 1 without the boat structure 16 thereupon for normal vehicle usage.

As shown in FIG. 6, a second embodiment of a torque means 136 is illustrated as connected to bumper member 19 of the vehicle structure 14. The torque means 136 includes a support shaft 139 secured to the bumper 19 by a connector assembly 141 having a pair of torsion shafts 143 and 145 connected to respective circular support plates 146 which, in turn, are connected to the support frame means 32. The support shaft 139 is of a large tubular shape having end plates 147 with a control hole 149 and on off set hole 151 to receive the respective torsion shafts 143 and 145 therein.

The connector assembly 141 includes a support plate 153 having a pair of C-type clamp members 155 thereon mounted about the support shaft 139 to hold against rotational movement in the adjusted position. The circular support plates 146 are secured as by welding to respective ones of the torsion shafts 143 and 145 which are placed in central holes 149. The opposite ends of the respective torsion shafts 143 and 145 have an L-shaped section 157 operable to contact the other one of the torsion shafts 143 and 145 as will be explained. The circular support plates 146 are further connected to the connector bars 54 and the support rods 56 as described in the previous description.

In the use and operation of the torque means 136, the rearward movement of the support frame means 32 as shown by arrow 161 causes the off set L-shaped section 157 of torsion shaft 143 to contact the stationary end of torsion shaft 145. This occurs in reverse at the other side and creates a resistance to rearward movement by twisting of the torsion shafts 143 and 145 to provide a biasing means to aid in loading and unloading as described for the torque means 30.

Additionally, it is noted that the support 139 can be rotated in the connector assembly 141 on loosening of the clamp members 155 to vary the torsion effect and force of the torsion shafts 143 and 145 for use on boat structure of varying lengths and weights.

It is seen that the boat conveyance means provides a basic support means and an intermediate support and anchor means interconnected by a winch means; all of which can be mounted in an easy compact manner on a vehicle structure and operable to move a boat structure from the unloaded to the loaded condition with a minimum amount of time and effort involved. The boat conveyance means of this invention is economical to manufacture; easy to assemble; durable in construction; safe in usage; and substantially maintenance free.

While the invention has been described in conjunction with preferred specific embodiments thereof, it will be understood that this description is intended to illustrate and not to limit the scope of the invention, which is defined by the following claims.

I claim:

1. A boat conveyance means adapted to be mounted on a vehicle structure and attached to a boat structure in order to elevate and invert for conveyance purposes, comprising:
   a. a basic support means having a bumper connector means securable to a rearward bumper member of the vehicle structure,
   b. an intermediate support and anchor means mountable on the upper area of the vehicle structure to receive and anchor the boat structure thereto,
   c. a connector means mountable on a forward end portion of the vehicle structure connectable to one end of the boat structure for controlling movement from load to unload condition,
   d. said basic support means having biasing means to urge the boat structure from the load to the unload condition held against such movement by said connector means so as not to require substantial physical effort on the part of the operator utilizing said boat conveyance means, and
   e. said basic support means including a bumper connector means securable to the rear bumper of the vehicle structure; a support frame means extended upwardly and forwardly from said bumper connector means to receive the other end of boat structure thereupon,
   f. whereby the rear portion of the boat is supported during loading and in it's final load position by said support frame.

2. A boat conveyance means as described in claim 1, wherein:
   a. said connector means being a winch means having a winch member connectable by a connector line to the boat structure to provide means for moving the said from the load to the unload conditions; and
   b. said intermediate support and anchor means having an anchor assembly securable to the top portion of the vehicle structure connectable to the boat structure for anchoring against lateral movement;
   c. said support frame means having a vertical support assembly pivotally connected to said bumper connector means; and
   d. a horizontal support assembly secured to said vertical support assembly having connector members contacting the boat structure to hold same against longitudinal and lateral movement.

3. A boat conveyance means adapted to be mounted on a vehicle structure and attached to a boat structure in order to elevate and invert for conveyance purposes, comprising:
   a. a basic support means having a bumper connector means securable to a rearward bumper member of the vehicle structure,
   b. an intermediate support and anchor means mountable on the upper area of the vehicle structure to receive and anchor the boat structure thereto,
   c. a connector means mountable on a forward end portion of the vehicle structure connectable to the boat structure for controlling movement from load to unload condition,
   d. said basic support means having biasing means to urge the boat structure from the load to the unload condition held against such movement by said connector means so as not to require substantial physical effort on the part of the operator utilizing said boat conveyance means,
   e. said basic support means including a bumper connector means securable to the rear bumper of the vehicle structure; a support frame means extended upwardly and forwardly from said bumper connector means to receive the boat structure thereupon; and
   f. said biasing means having a torque means mounted between said bumper connector means and said support frame means operable tO bias the boat structure under torque from the load to the unload condition.

4. A boat conveyance means as described in claim 3, wherein;
   a. said support frame means having a vertical support assembly pivotally connected to said bumper connector means; and
   b. a horizontal support assembly secured to said vertical support assembly having connector means contacting the boat structure to hold same against longitudinal and lateral movement.

5. A boat conveyance means as described in claim 3, wherein:

a. said intermediate support and anchor means having an anchor assembly; a connector belt assembly secured to said anchor assembly and a forward roller structure; and b. said connector belt assembly having a belt member secured to said anchor assembly connectable to the boat structure.

6. A boat conveyance means as described in claim 5, wherein:

a. said anchor assembly including a support member having downwardly extended suction cups mountable on a top surface of the vehicle structure; and b. said anchor assembly having upright spaced connector posts mountable in holes in the boat structure to hold against lateral and longitudinal movement.

7. A boat conveyance means as described in claim 3, wherein;

a. said torque means including a pair of torque spring members secured to said bumper connector means and having a portion thereof adjustably connected to said support frame means whereby said torque spring members can be regulated in torque to vary the force for moving said support frame means from the load to the unload condition which is desired depending on the weight of the boat structure.

8. A boat conveyance means as described in claim 1, wherein:

said basic support means including a rearward support assembly;

b. said rearward support assembly having a support foot assembly held in a vertical position under the force of gravity;

c. said support foot assembly having a foot member engaged with the ground support surface when said basic support means is moved to the load-unload condition; and d. said support foot assembly moved into a storage position against said support frame means when said boat conveyance means is in the loaded condition.

9. A boat conveyance means as described in claim 3, wherein:

a. said torque means having a pair of torsion shaft members mounted in plate members secured to said bumper connector means and a portion connected tO said support frame means, b. said torsion shaft members extended within a support shaft secured to said bumper connector means and providing a biasing effect against rotational movement of said support frame means.

* * * * *